(12) United States Patent
Mizumaki et al.

(10) Patent No.: US 8,339,345 B2
(45) Date of Patent: Dec. 25, 2012

(54) LIQUID CRYSTAL DISPLAY DEVICE, INSTRUMENT PANEL, AUTOMOTIVE VEHICLE, AND LIQUID CRYSTAL DISPLAY METHOD

(75) Inventors: Hidetaka Mizumaki, Nara (JP); Yasuhiro Wakita, Kuwana (JP)

(73) Assignee: Sharp Kabushiki Kaisha, Osaka (JP)

( * ) Notice: Subject to any disclaimer, the term of this patent is extended or adjusted under 35 U.S.C. 154(b) by 971 days.

(21) Appl. No.: 11/990,397

(22) PCT Filed: May 29, 2006

(86) PCT No.: PCT/JP2006/310628
§ 371 (c)(1),
(2), (4) Date: Feb. 13, 2008

(87) PCT Pub. No.: WO2007/037042
PCT Pub. Date: Apr. 5, 2007

(65) Prior Publication Data
US 2009/0251299 A1  Oct. 8, 2009

(30) Foreign Application Priority Data

Sep. 27, 2005 (JP) ................................ 2005-280887

(51) Int. Cl.
*G09G 3/36* (2006.01)
(52) U.S. Cl. ........................ 345/89; 345/100; 345/690
(58) Field of Classification Search .................. 345/89, 345/100, 101, 102, 204, 690
See application file for complete search history.

(56) References Cited

U.S. PATENT DOCUMENTS

| 7,145,535 | B2 | 12/2006 | Takako et al. | |
|---|---|---|---|---|
| 7,567,229 | B2* | 7/2009 | Kasai et al. | 345/89 |
| 7,643,040 | B1* | 1/2010 | Gabrielson et al. | 345/690 |
| 7,675,497 | B2* | 3/2010 | Park | 345/89 |
| 2002/0008696 | A1* | 1/2002 | Wagner | 345/204 |
| 2002/0044115 | A1* | 4/2002 | Jinda et al. | 345/87 |
| 2003/0011553 | A1* | 1/2003 | Ozaki | 345/89 |
| 2003/0058264 | A1 | 3/2003 | Takako et al. | |
| 2003/0179175 | A1* | 9/2003 | Shigeta et al. | 345/101 |
| 2003/0231157 | A1* | 12/2003 | Sugino et al. | 345/101 |
| 2004/0196229 | A1* | 10/2004 | Ham | 345/87 |
| 2004/0213457 | A1* | 10/2004 | Mori | 382/167 |
| 2004/0233230 | A1* | 11/2004 | Hancock | 345/690 |
| 2005/0024310 | A1* | 2/2005 | Shiomi et al. | 345/89 |
| 2005/0253797 | A1* | 11/2005 | Kamada et al. | 345/89 |
| 2006/0158415 | A1* | 7/2006 | Izumi | 345/98 |
| 2006/0164355 | A1* | 7/2006 | Kim et al. | 345/89 |
| 2007/0164946 | A1* | 7/2007 | Akutsu et al. | 345/87 |

FOREIGN PATENT DOCUMENTS

| JP | 9-106262 | 4/1997 |
|---|---|---|
| JP | 11-296149 | 10/1999 |

* cited by examiner

*Primary Examiner* — Amare Mengistu
*Assistant Examiner* — Premal Patel
(74) *Attorney, Agent, or Firm* — Harness, Dickey & Pierce, P.L.C.

(57) ABSTRACT

In one embodiment of the present invention, a liquid crystal display device is provided with a gray scale conversion section which converts a gray scale conveyed by an input video signal into a gray scale value of a high gray scale region, and then outputs it to the liquid crystal drive device if the gray scale value of the input video signal is of a low gray scale region.

17 Claims, 9 Drawing Sheets

Input Gray Scale Value (6 Bits)

| MSB1 | MSB2 | MSB3 | MSB4 | MSB5 | LSB |

|  |  | The Most Significant 2 Bits | |
|---|---|---|---|
|  |  | MSB1orMSB2=1 | MSB1 and MSB2=0 |
| The Least Significant 4 Bits | 15 | 15 | 15 |
|  | 14 | 14 | 14 |
|  | 13 | 13 | 13 |
|  | 12 | 12 | 12 |
|  | 11 | 11 | 11 |
|  | 10 | 10 | 10 |
|  | 9 | 9 | 10 |
|  | 8 | 8 | 10 |
|  | 7 | 7 | 10 |
|  | 6 | 6 | 10 |
|  | 5 | 5 | 10 |
|  | 4 | 4 | 10 |
|  | 3 | 3 | 10 |
|  | 2 | 2 | 10 |
|  | 1 | 1 | 10 |
|  | 0 | 0 | 10 |

Converted Gray Scale Value

Region Where Gray Scale Value Is Converted

FIG. 7

| | | The Most Significant 2 Bits | |
|---|---|---|---|
| | | MSB1orMSB2=1 | MSB1 and MSB2=0 |
| The Least Significant 4 Bits | 15 | 15 | 15 |
| | 14 | 14 | 15 |
| | 13 | 13 | 14 |
| | 12 | 12 | 14 |
| | 11 | 11 | 13 |
| | 10 | 10 | 13 |
| | 9 | 9 | 13 |
| | 8 | 8 | 12 |
| | 7 | 7 | 12 |
| | 6 | 6 | 12 |
| | 5 | 5 | 11 |
| | 4 | 4 | 11 |
| | 3 | 3 | 11 |
| | 2 | 2 | 10 |
| | 1 | 1 | 10 |
| | 0 | 0 | 10 |

Converted Gray Scale Value

Region Where Gray Scale Value Is Converted

|  |  | Transmittance | Next Frame Gray Scale Value | | | | | | | | |
|---|---|---|---|---|---|---|---|---|---|---|---|
|  |  |  | 0 | 10 | 16 | 24 | 32 | 40 | 48 | 56 | 63 |
| Current Frame Gray Scale Value | 0 | 0.0 |  | 193 | 86 | 54 | 40 | 28 | 22 | 15 | 9 |
|  | 10 | 2.1 | 13 |  | 74 | 43 | 37 | 27 | 25 | 16 | 8 |
|  | 16 | 5.4 | 13 | 46 |  | 38 | 35 | 28 | 22 | 19 | 7 |
|  | 24 | 12.6 | 12 | 25 | 36 |  | 29 | 25 | 22 | 19 | 6 |
|  | 32 | 23.3 | 12 | 24 | 32 | 33 |  | 23 | 21 | 19 | 6 |
|  | 40 | 37.5 | 12 | 21 | 26 | 27 | 27 |  | 21 | 19 | 6 |
|  | 48 | 55.6 | 11 | 19 | 23 | 26 | 24 | 21 |  | 19 | 5 |
|  | 56 | 77.5 | 12 | 19 | 22 | 24 | 23 | 21 | 20 |  | 5 |
|  | 63 | 100.0 | 14 | 19 | 23 | 24 | 24 | 23 | 23 | 20 |  |

Response Speed (35 °C)

| | Transmittance | Next Frame Gray Scale Value | | | | | | | |
|---|---|---|---|---|---|---|---|---|---|
| | | 0 | 10 | 16 | 24 | 32 | 40 | 48 | 56 | 63 |
| 0 | 0.0 | | 449 | 305 | 196 | 147 | 108 | 84 | 57 | 27 |
| 10 | 2.1 | 57 | | 255 | 162 | 127 | 95 | 77 | 51 | 23 |
| 16 | 5.4 | 64 | 164 | | 94 | 117 | 88 | 74 | 53 | 22 |
| 24 | 12.6 | 55 | 113 | 95 | | 99 | 78 | 66 | 48 | 20 |
| 32 | 23.3 | 51 | 100 | 107 | 95 | | 72 | 64 | 46 | 20 |
| 40 | 37.5 | 48 | 79 | 94 | 90 | 80 | | 56 | 43 | 18 |
| 48 | 55.6 | 44 | 68 | 80 | 79 | 79 | 68 | | 40 | 18 |
| 56 | 77.5 | 46 | 65 | 80 | 79 | 74 | 64 | 50 | | 16 |
| 63 | 100.0 | 48 | 67 | 75 | 77 | 78 | 68 | 61 | 45 | |

(Current Frame Gray Scale Value — row labels)

Response Speed (0 °C)

| | Transmittance | Next Frame Gray Scale Value | | | | | | | |
|---|---|---|---|---|---|---|---|---|---|
| | | 0 | 10 | 16 | 24 | 32 | 40 | 48 | 56 | 63 |
| Current Frame Gray Scale Value 0 | 0.0 | ■ | 1472 | 846 | 624 | 492 | 362 | 271 | 177 | 82 |
| 10 | 2.1 | 206 | ■ | 846 | 580 | 462 | 318 | 257 | 174 | 73 |
| 16 | 5.4 | 158 | 376 | ■ | 453 | 373 | 285 | 230 | 164 | 64 |
| 24 | 12.6 | 142 | 279 | 370 | ■ | 257 | 267 | 212 | 152 | 61 |
| 32 | 23.3 | 129 | 234 | 312 | 269 | ■ | 233 | 200 | 151 | 54 |
| 40 | 37.5 | 120 | 201 | 277 | 257 | 223 | ■ | 175 | 140 | 51 |
| 48 | 55.6 | 120 | 169 | 230 | 250 | 216 | 166 | ■ | 120 | 57 |
| 56 | 77.5 | 121 | 163 | 205 | 216 | 204 | 169 | 158 | ■ | 120 |
| 63 | 100.0 | 124 | 165 | 190 | 213 | 206 | 200 | 173 | 158 | ■ |

LIQUID CRYSTAL DISPLAY DEVICE, INSTRUMENT PANEL, AUTOMOTIVE VEHICLE, AND LIQUID CRYSTAL DISPLAY METHOD

TECHNICAL FIELD

The present invention relates to a liquid crystal display device, an instrumental panel, an automobile vehicle, and a liquid crystal display means, in each of which a response speed of liquid crystal can be stably within a requested specification and a circuit dimension can be downsized.

BACKGROUND ART

As FIG. 8 shows, a gray scale-brightness feature of a liquid crystal display device is generally set to have a gray scale curve of $\gamma=2.2$ and a display response speed of the liquid crystal display device varies depending of temperature. Especially at lower temperature, the response speed tends to be slowed due to viscosity of liquid crystal or the like.

On the other hand, the response speed of the liquid crystal device has been progressively improved by improvement of liquid crystal material used or by the application of the narrower cell gap. However, this improvement has not attained fundamentally satisfactory response speed.

Under these circumstances, so-called overshoot drive technique is adopted in order to attain a better response speed in a current liquid crystal television or the like. (See Patent Document 1: Japanese Unexamined Patent Application Publication, Tokukai, No. 2003-172915 (date of publication: Jun. 20, 2003).)

DISCLOSURE OF INVENTION

The overshoot drive technique has an advantage that it improves the response speed of liquid crystal while it has a disadvantage that it has to adjust a LUT (Look-Up-Tale) in order to respond to varieties in response features of liquid crystal used in the liquid crystal display devices. Use of the LUT requires a frame memory for storing gray scale data for each frame, which results in a large circuit dimension of the display device.

Furthermore, if the liquid crystal display device is applied in a device required to function at lower temperature than a television is required to function at, the response speed of the liquid crystal will be slower than that of the television. As a result, decreases in the response speed will be alleviated only partially even with the overshoot drive technology.

A relation between the response speed of the liquid crystal and temperature will be explained with references to FIGS. 9, 10, and 11. FIG. 9 (*a*) is a matrix chart illustrating response speeds of liquid crystal at 35° C. for combinations of gray scales of a current frame and a next frame. FIG. 9 (*b*) shows the data of FIG. 9 (*a*) in three-dimension. FIGS. 10 (*a*) and 10 (*b*) show the response speeds of liquid crystal at 0° C. in the same manner as FIGS. 9 (*a*) and 9 (*b*) do respectively. FIGS. 11 (*a*) and 11 (*b*) show the same at −15° C.

A liquid crystal display device for automobile use must have a response speed in a range from 150 ms to 300 ms. If a response speed of 300 ms is required supposedly, the liquid crystal display device operates at response speeds of 300 ms or less for every combination at 35° C. (See FIG. 9 (*b*).), and thus can operate without any problem.

However, there are some cases at 0° C. and −15° C. that the response speed is increased to be higher than 300 ms (See FIG. 10 (*b*) and FIG. 11 (*b*).), thereby failing to satisfy the required specification for the response speed. The required response speed (requested specification) for liquid crystal is determined in accordance with necessity when the liquid crystal display device is designed.

Particularly with a case of a liquid crystal display device for the automobile use, human life will be at risk if the requested specification for the response speed is not satisfied. For instance, there is an occasion when the liquid crystal display device shows an image of a surrounding landscape captured from a moving vehicle. If the liquid crystal display fails to reflect the moving image of the landscape due to decreases in the response speed of the liquid crystal, the driver may not recognize an object shown on the liquid crystal display device beforehand to avoid a traffic accident.

The present invention is accomplished in view of the aforementioned conventional problems. An object of the present invention is to provide a liquid crystal display device, an instrumental panel, an automobile vehicle, and a liquid crystal display means, in each of which a response speed of the liquid crystal can be stably within a requested specification and a circuit dimension can be downsized.

In order to solve the conventional problem, a liquid crystal display device of the present invention is a liquid crystal display device including a liquid crystal drive device for operating the liquid crystal according to an input video signal inputted in the liquid crystal display device, comprising: a gray scale conversion means, which, if the input video signal conveying a gray scale value belonging to a low gray scale region, converts the gray scale value of the input video signal to a gray scale value belonging to a high gray scale region, and outputs the video signal having the converted gray scale value to the liquid crystal drive device, where the low gray scale region is one of two regions into which a range of possible gray scale values are divided and to which gray scale values that cause the display device to display at low luminance are belonged, and the high gray scale region is the other one of the two regions to which gray scale values that cause the display device to display at high luminance are belonged.

As a result of diligent studies, the inventors of the present invention found that there is a certain correlation between the input gray scale value and the response speed of the liquid crystal, and that the response speed of the liquid crystal is lowered if the input gray scale value is of the low gray scale region while the response speed of the liquid crystal is stable if the input gray scale value is of the high gray scale region.

Consequently, in this configuration, if the video signal conveying the gray scale value belonging to the low gray scale region is inputted, the gray scale conversion means converts the gray scale value of the input video signal to a gray scale value belonging to the high gray scale region. This stabilizes the response speed of the liquid crystal. Therefore, by setting the high gray scale region within a range in which the required response speed of the liquid crystal is satisfied, it becomes possible to satisfy the required specification of the response speed of the liquid crystal regardless of the input gray scale value.

Furthermore, the gray scale conversion process of the gray scale conversion means can be realized without the frame memory. This makes it possible to downsize the circuit size.

For a fuller understanding of the nature and advantages of the invention, reference should be made to the ensuing detailed description taken in conjunction with the accompanying drawings.

BRIEF DESCRIPTION OF DRAWINGS

FIG. 7 shows another exemplary LUT used by the gray scale conversion section in FIG. 1.

FIG. 9 (*b*) is a view showing the data of FIG. 9 (*a*) in three-dimension.

FIG. 10 (*b*) is a view showing the data of FIG. 10 (*a*) in three-dimension.

FIG. 11 (*b*) is a graph showing the data of FIG. 11 (*a*) in three-dimension.

BEST MODE FOR CARRYING OUT THE INVENTION

1. Configuration of the Display System

One embodiment of the liquid crystal display device of the present invention will be explained below. An instrumental panel for an automobile vehicle (such as an automobile, a train, a bus or the like) will be explained here to illustrate the embodiment of a display system in which the liquid crystal display device of the present invention is applied.

Figure 1:
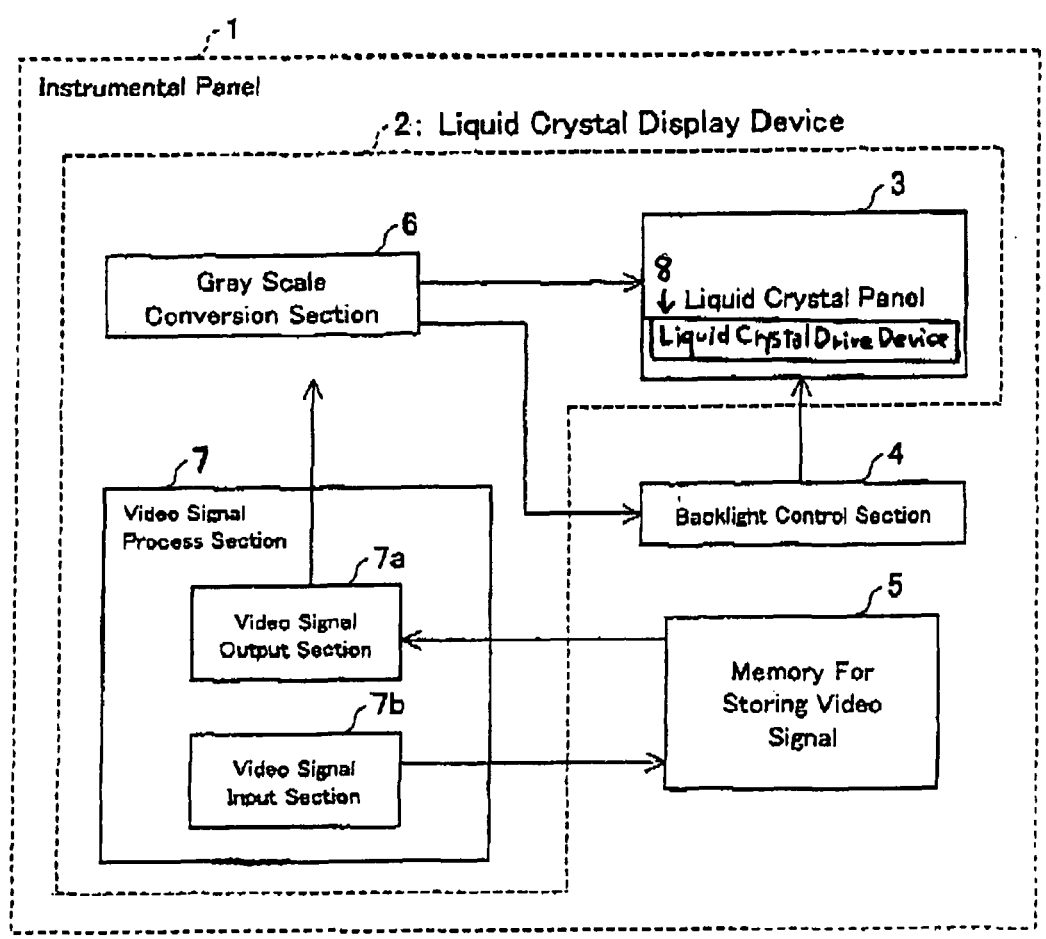
FIG. 1 is a block diagram showing a configuration of an instrumental panel in accordance with an embodiment of the present invention.

As FIG. 1 shows, an instrumental panel 1 of the present embodiment comprises a liquid crystal display device 2, a backlight control section (a light source luminance adjustment means) 4, and a memory 5 for storing a video signal. Further, the liquid crystal display device 2 comprises a liquid crystal panel 3, a gray scale conversion section (a gray scale conversion means) 6, and a video signal process section 7. The video signal process section 7 comprises a video signal output section 7*a* and a video signal input section 7*b*.

The liquid crystal panel 3 is a liquid crystal panel module comprising a driver IC (a liquid crystal drive device 8), a backlight (a light source), and the other members. The backlight control section 4 controls brightness of backlight installed to the liquid crystal panel 3.

By the video signal input section 7*b*, various video signals input through an interface (not illustrated) provided to the instrumental panel 1 are written in prescribed regions of the memory 5.

The memory 5 temporarily stores the video signal input from the video signal input section 7*b* as the signal to be displayed on the liquid panel 3. Also, the memory 5 is used for such operation as the image process is conducted.

The video signal output section 7*a* reads a video signal in the memory 5 and generates the video signal to be displayed on the liquid crystal panel 3, then outputs it to the liquid crystal panel 3 through the gray scale conversion section 6.

The gray scale conversion section 6 converts the gray scale value of the video signal input by the video signal output section 7*a*; therefore, it is a characterizing portion of the liquid crystal display device 2 of the present embodiment. The conversion process of the gray scale conversion section 6 will be explained later.

According to the configuration above, the instrumental panel 1 of the present embodiment is arranged such that the video signal temporarily stored in the memory 5 is output through the video signal output section 7*a* and through the gray scale conversion section 6, and then is displayed on the liquid crystal panel 3. Particularly through the gray scale conversion by the gray scale conversion section 6, the instrumental panel 1 is improved in its response speed of the liquid crystal. The process of the gray scale conversion section 6 will be specifically explained below.

2. Brief Summary of the Gray Scale Conversion Process

Figure 2:
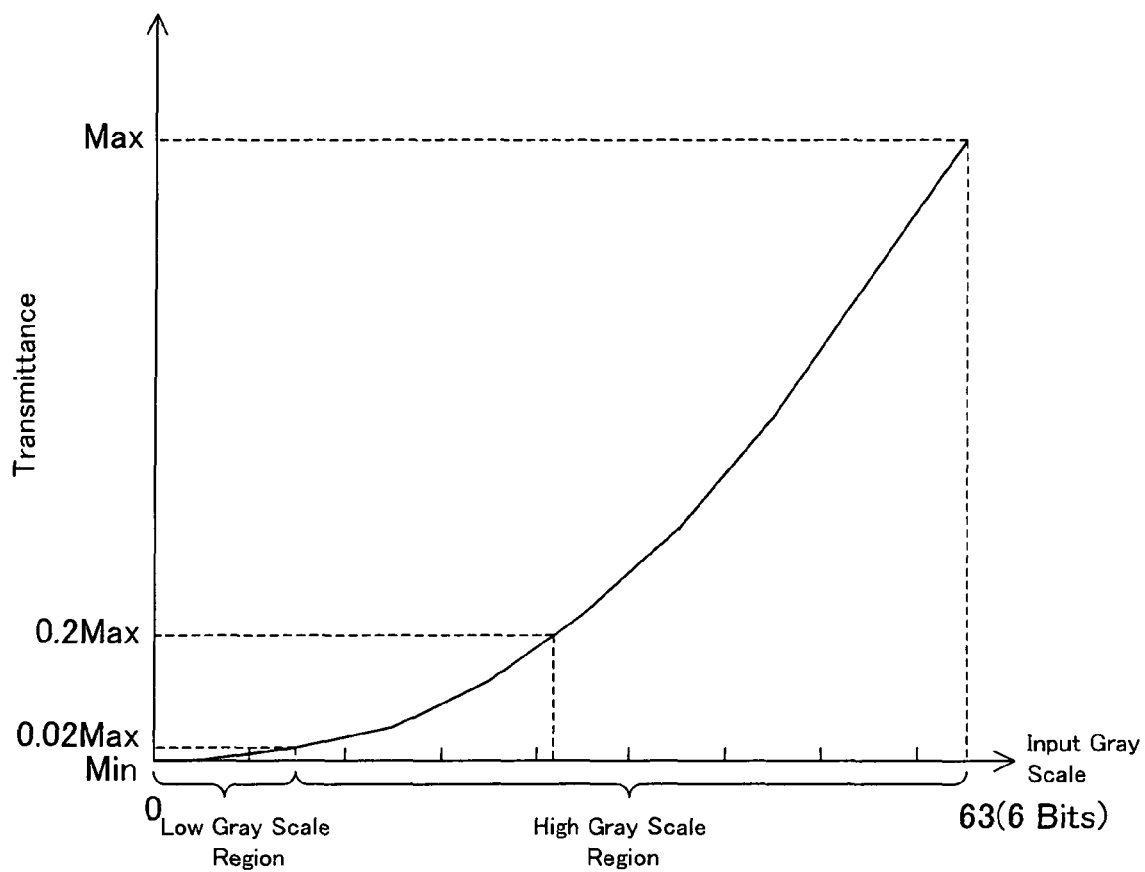
FIG. 2 is a graph showing a relation between an input gray scale value and a transmittance on a liquid crystal panel of FIG. 1.

FIG. 2 is a graph showing the relation between a gray scale value (an input gray scale value) conveyed by the video signal input to the liquid crystal panel 3 (FIG. 1) and the transmittance. The process of the gray scale conversion section 6 will be briefly summarized with reference to this figure. In FIG. 2, it is assumed that the input gray scale value is expressed in 6 bits.

Here, it is presupposed that as FIG. 2 shows, a range of the input gray scale values is divided into two regions: the low gray scale region and the high gray scale region. Threshold level dividing them equals to an input gray scale value corresponding with the transmittance of 0.02 Max. (Max is the Maximum Value of the Transmittance.)

As a matter of course, the value of the transmittance used as the threshold level (0.02 Max) dividing the two regions is illustrative only and can be any other value. For instance, 0.2 Max can also be used as the threshold level dividing the low gray scale region from the high gray scale region.

When the range of the gray scale values are divided into the two regions, the gray scale conversion section 6 converts the gray scale value of the low gray scale region into that of the high gray scale region if the video signal conveying the gray scale value of the low gray scale region is input by the video signal output section 7*a*. By conducting such gray scale conversion process, the present invention improves the response speed of the liquid crystal at lower temperature. The mechanism that the response speed is improved will be explained below.

Figures 10A, 10B:
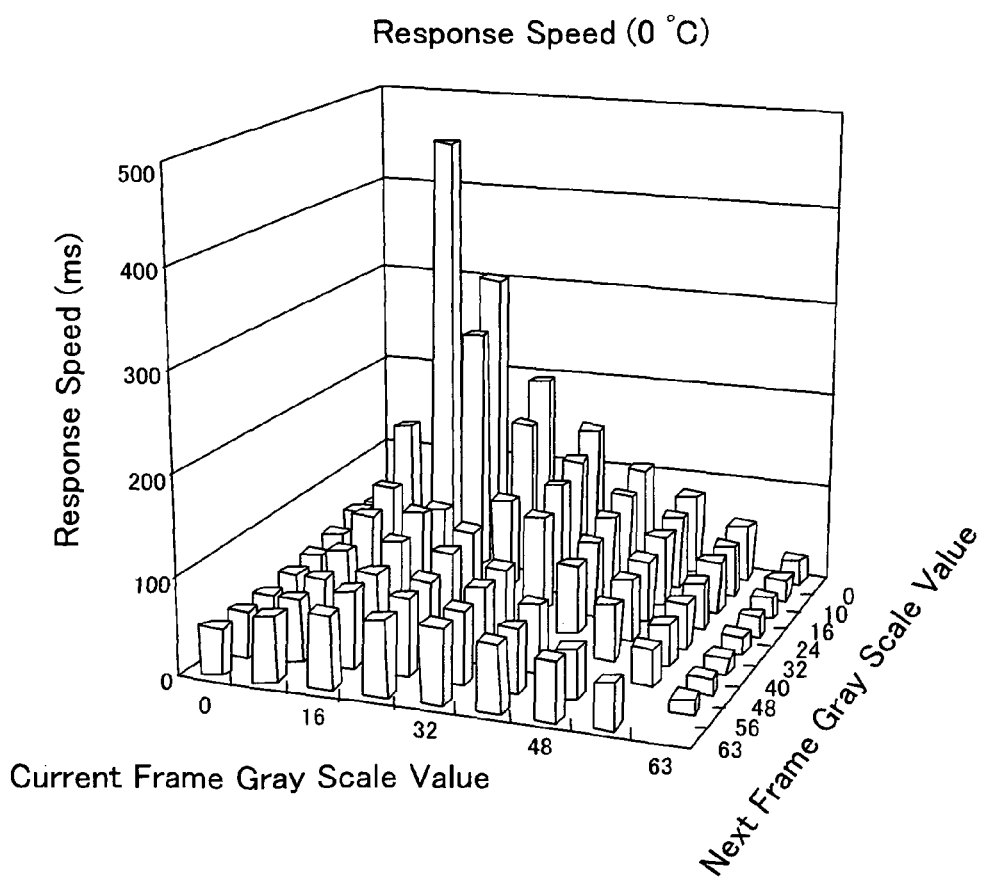
FIG. 10 (*a*) is a matrix chart illustrating response speeds of the liquid crystal at 0° C. for combinations of gray scale values of the current frame and the next frame.
Figure 11:
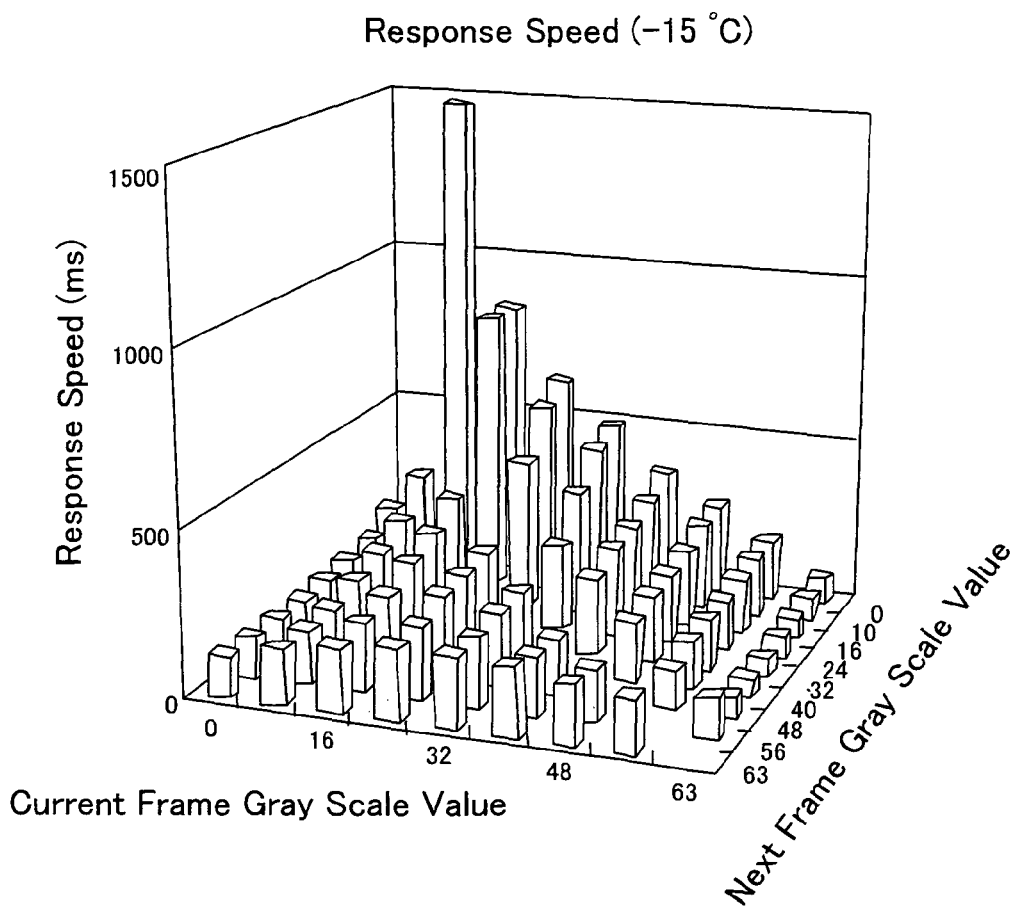
FIG. 11 (*a*) is a matrix chart illustrating response speeds of the liquid crystal at −15° C. for combinations of gray scale values of the current frame and the next frame.

For instance, if it is required that "the response speed less than or equal to 300 ms at 0° C.," the requested specification will be satisfied regardless of the gray scale value of the next frame, as long as the input gray scale value (the gray scale value of the current frame) is greater than or equal to 10 as FIG. 10 (*a*) shows. On the other hand, when the input gray scale value is 0, the required specification will not be satisfied since the response speed becomes greater than 300 ms when the next frame gray scale value is 10 or 16.

From this, it can be said that the required specification will be satisfied if the input gray scale value less than 10 is converted into a gray scale value greater than or equal to 10. Thus, the low gray scale region and the high gray scale region are set as:

the low gray scale region . . . the range where the gray scale values is from 0 to 9;

the high gray scale region ... the range where the gray scale values is from 10 to 63.

Then, it can be referred that when the video signal part 7a inputs a video signal conveying the gray scale value of the low gray scale region, the gray scale conversion section 6 converts the gray scale value into that of the high gray scale region, thereby improving the response speed of the liquid crystal. Such gray scale conversion process performed by the gray scale conversion section 6 can be realized in various ways. Some specific illustrations of the gray scale conversion process performed by the gray scale conversion section 6 are described below.

The gray scale conversion process, which intentionally converts the gray scale of the low gray scale region into the gray scale of the high gray scale region, results in intentional decreases in a contrast ratio; however, the present invention prioritizes the improvement of the response speed of the liquid crystal over the decreases in contrast ratio.

3. Process with LUT

First, the gray scale conversion section 6 conducts the gray scale conversion process with a LUT (Look Up Table). The LUT should be stored in the memory 5 (FIG. 1). The conversion process of the gray scale with the LUT will be explained below.

Figures 3, 4:
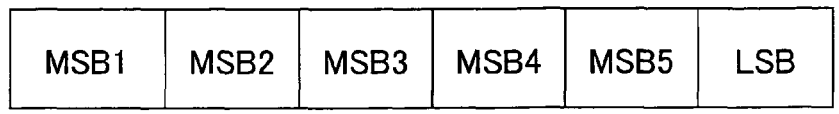
FIG. 3 is a diagram showing a bit expression of the input gray scale value.
FIG. 4 shows an exemplary LUT used by a gray scale conversion section of FIG. 1.

For instance, it is premised that an input gray scale value is expressed in 6 bits composed of MSB 1, MSB 2, MSB 3, MSB 4, MSB 5, and LSB as FIG. 3 shows. In such case, the gray scale value will be calculated by a formula below:

$$A \text{ gray scale value} = MSB1 \times 2^5 + MSB2 \times 2^4 + MSB3 \times 2^3 + MSB4 \times 2^2 + MSB5 \times 2^1 + LSB$$

As described previously, it is premised that when the video signal output section 7a inputs the video signal conveying the gray scale value of the low gray scale region (the range where the gray scale value is from 0 to 9), the gray scale conversion section 6 converts the gray scale value into that of the high gray scale region (the range where the gray scale value is from 10 to 63) so that the requested specification of "the response speed is less than or equal to 300 ms at 0° C." will be satisfied.

In the case above, the gray scale conversion section 6 can convert the gray scale value by referring to such LUT as shown in FIG. 4. In the LUT, values of the most significant 2 bits (MSB 1 and MSB 2) and the least significant 4 bits (MSB 3 to 5) of the input gray scale value are associated with converted gray scale values.

Here, if the value of either MSB 1 or MSB 2 is 1, the input gray scale value should not be less than 10. If the input gray scale value is less than 10, it follows that the values of both MSB 1 and MSB 2 are 0 and that the value of the least significant 4 bits of the input gray scale value falls between 0 and 9.

So, the LUT shown in FIG. 4 is set such that if the value of MSB 1 or MSB 2 is 1, the input gray scale value conveyed by the least significant 4 bits directly becomes the converted gray scale value. Further, when the values of MSB 1 and MSB 2 are 0, the LUT is set such that if the input gray scale value conveyed by the least significant 4 bits is less than 10, the converted gray scale value becomes 10. The converted gray scale value can be any number greater or equal to 10 such as 11 or 12.

The gray scale conversion section 6 reads the values of the most significant 2 bits and the least significant 4 bits of the input gray scale value, and then according to the read value, refers to the LUT where the input gray scale values are associated with the converted gray scale values as described above. As a result, if the value less than 10 is input as the input gray scale value, the gray scale conversion section 6 can convert it into the value more than or equal to 10.

4. Process Comparing with the Threshold

Also, the grays scale conversion process of the gray scale conversion section 6 can be achieved through comparison of the input gray scale value with a prescribed threshold. The conversion process of the gray scale value in this case will be described below with reference to FIG. 5.

As in the case of the gray scale conversion process with the LUT described above, the gray scale conversion process which, if the value less than 10 is input as the input gray scale value, converts the input gray scale value into the value more than or equal to 10 is presupposed. In other words, the requested specification for the response speed that "the response speed is less than or equal to 300 ms at 0° C." is presupposed, yet this requested specification is illustrative only.

Figure 5:
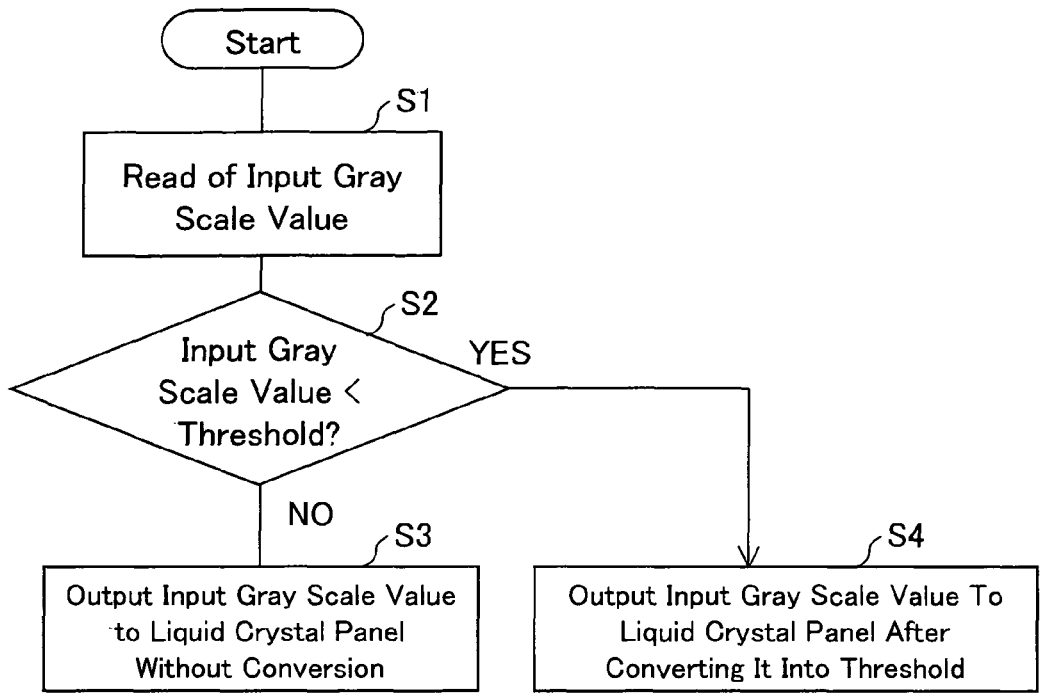
FIG. 5 is a flowchart showing an exemplary operation performed by the gray scale conversion section of FIG. 1.

As FIG. 5 shows, the gray scale value conversion section 6 reads the input gray scale value conveyed by the video signal from the video signal output section 7a (S1), and the gray scale value conversion section 6 measures whether or not the input gray scale value is less than the prescribed threshold level of 10(S2). This threshold level should be figured out in a procedure including the steps of; measuring the response speeds of the liquid crystal gained by inputting various gray scale values under a prescribed temperature condition; and calculating the range of the input gray scale values which satisfies the required specification for the response speed.

The gray scale conversion section 6 outputs the input gray scale value to the liquid crystal panel 3 without converting the input gray scale value, if the input gray scale value is judged to be greater than or equal to the threshold at S2 (S3). On the other hand, the gray scale conversion section 6 converts the input gray scale value into the value of 10, and outputs it to the liquid crystal panel 3, if the input gray scale value is judged to be less than the threshold at S2. A gray scale value after the conversion can be any value greater than or equal to 10 such as 11 and 12. This process may be arranged such that the input gray scale value is judged whether it is less than or equal to the threshold (10) at S2.

As described above, the gray scale conversion section 6 compares the input gray scale value with the prescribed threshold. With this configuration, if the gray scale conversion section 6 receives an input gray scale value less than 10, the gray scale conversion section 6 converts the input gray scale value less than 10 into a value greater than or equal to 10.

5. Process Converting Values of the Least Significant Bits

Figure 6:
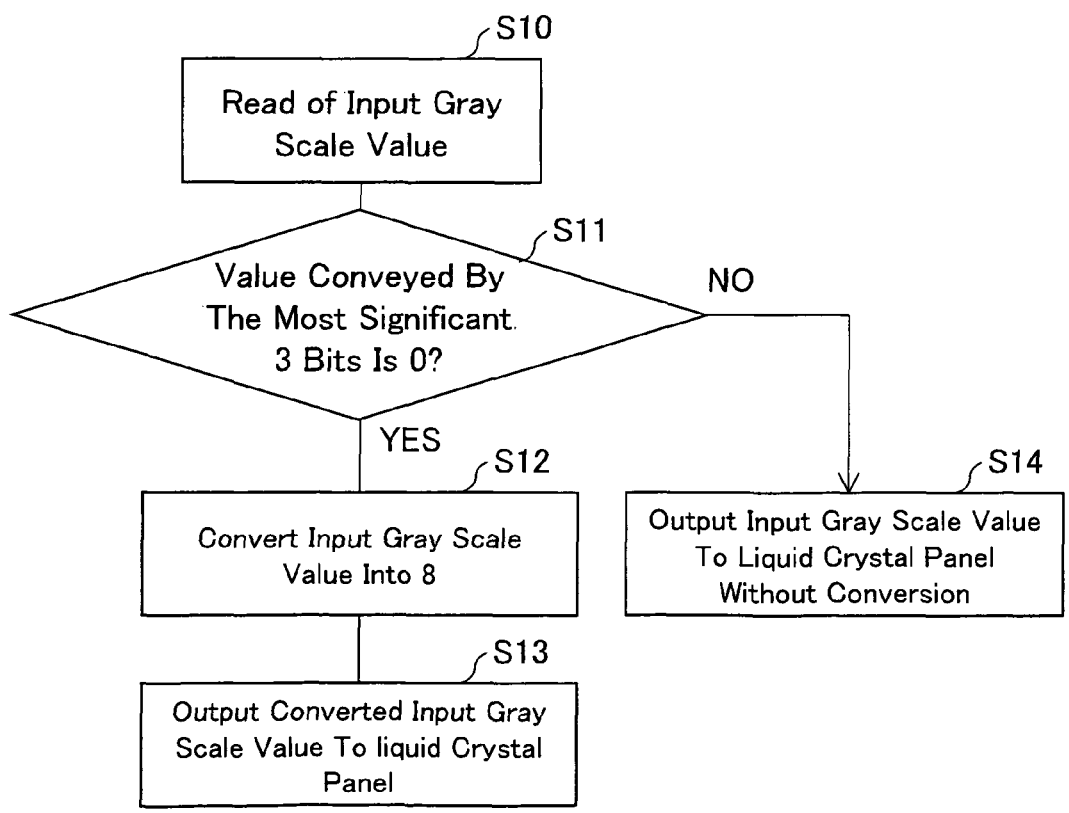
FIG. 6 is a flowchart showing another exemplary operation performed by the gray scale conversion section in FIG. 1.
Figure 8:
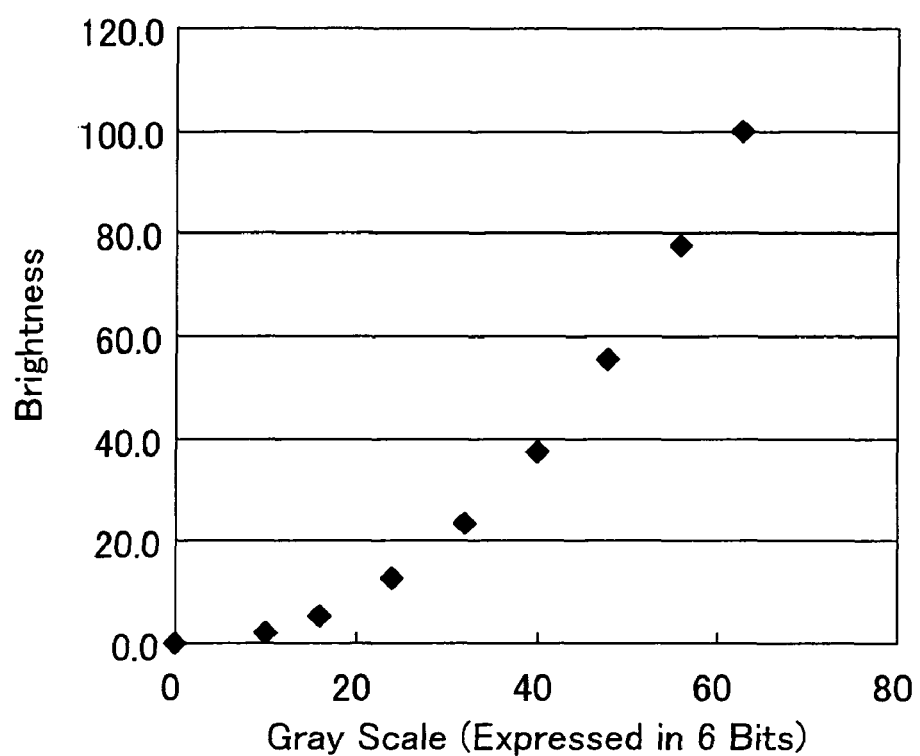
FIG. 8 is a view showing an exemplary gray scale-brightness feature in a liquid crystal display device.
Figures 9A, 9B:
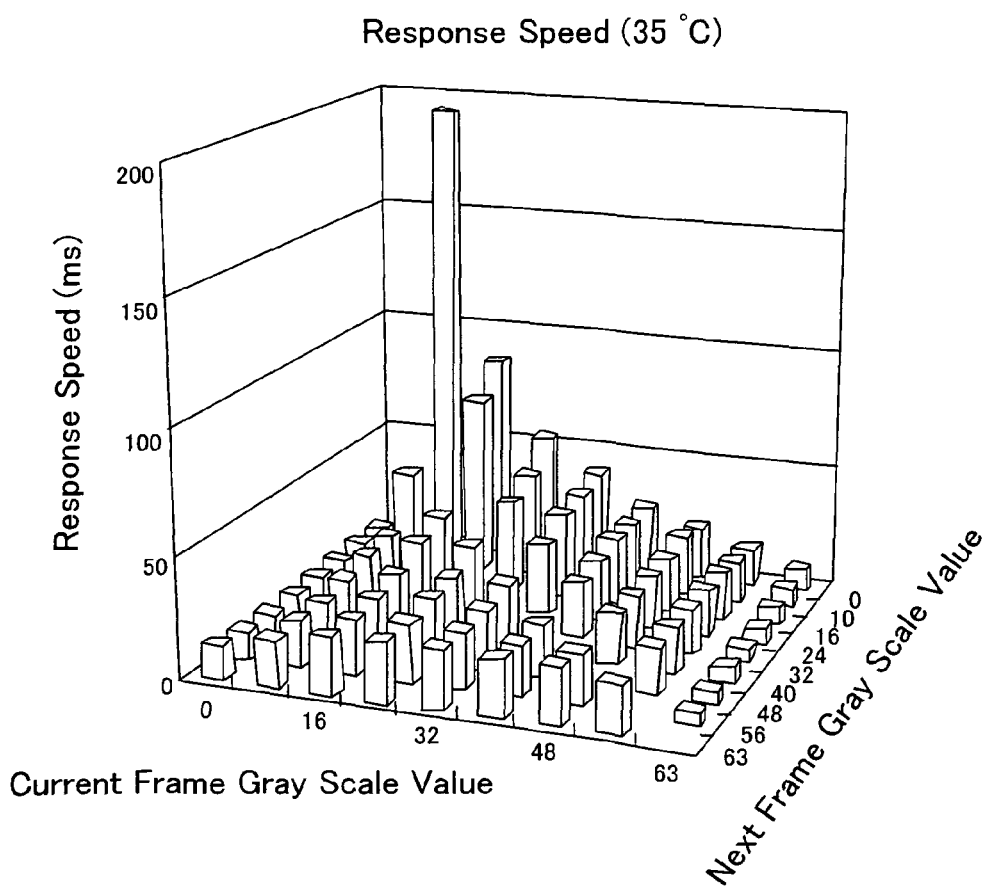
FIG. 9 (*a*) is a matrix chart illustrating response speeds of liquid crystal at 35° C. for combinations of gray scale values of a current frame and a next frame.

Further, the gray scale conversion section 6 conducts the gray scale conversion process by converting values of the least significant bits of the input gray scale. The gray scale conversion in this way is described below referring to FIG. 6.

Again, it is presupposed that the required specification of "the response speed is less than 300 ms at 0° C." is set to be satisfied. In this case, as described previously, no matter what value the next frame gray scale value takes, the specification will be satisfied as long as the input gray scale value (the current frame gray scale value) is greater than or equal to 10 (See FIG. 10 (a).).

Since there is still some margin between the requested specification of 300 ms and the maximum response speed of 255 ms obtained when the input gray scale value is 10, it is reasonably presumed that the response speed is always less than 300 ms even when an input value is greater or equal to 8. Therefore, it is assumed that when the video signal output section 7a outputs the gray scale value of the low gray scale region (the range where the gray scale value id from 0 to 7), the gray scale conversion section 6 converts it into the gray scale value of the high gray scale region (the range where the gray scale value is from 8 to 63) so that the requested specification will be satisfied.

First, the gray scale conversion section 6 reads the input gray scale value of the video signal from the video signal output section 7a (S10), and then judges whether or not the value of the most significant 3 bits combined is 0 (S11). The reason that only the most significant 3 bits are judged at S11 is described follows.

If the input gray scale value is greater than or equal to 8, it follows that one of the values of the most significant 3 bits (MSB 1, MSB2, and MSB 3) must be 1. Paradoxically speaking, if the input gray scale value is less than 8, it follows that all the values of the most significant 3 bits are 0. Therefore, the gray scale conversion section 6 judges at S11 whether or not the input gray scale value is less than 8 by judging whether or not the value of the most significant 3 bits combined is 0.

If judging that all of their values are 0 at S11, the gray scale conversion section 6 will convert the input gray scale value into the value of 8 (S12), and output it to the liquid crystal panel 3. On the other hand, if it is judged at S11 that the values of the most significant 3 bits combined do not equal to 0, the gray scale conversion section 6 outputs the input gray scale value to the liquid crystal panel 3 without converting the input gray scale value.

When the transmittance of 0.2 Max is used to divide the low gray scale region from the high gray scale region as described previously, the corresponding gray scale value of 32 will become the threshold (See FIG. 2.).

In this case, values of the least significant 5 bits of the input gray scale value should be converted in the following manner.

When the value of MSB 1 (See FIG. 3.) is 1, the input gray scale value will become greater than or equal to 32. Thus, the gray scale conversion section 6 outputs the values of the least significant 5 bits (MSB2 to MSB5, LSB) to the liquid crystal panel 3 without converting the values.

On the other hand, when the value of the MSB of the input gray scale value is 0, the input gray scale value will become less than 32. In this case, the gray scale conversion section 6 may either converts each value of the least significant 5 bits into 1 or converts the value of MSB 1 into 1 and the rests into 0.

6. Backlight Brightness Control

As described above, if the video signal output section 7a outputs the video signal conveying the gray scale value of the low gray scale region to the gray scale conversion section 6 in the liquid crystal display device 2 of the present embodiment, the gray scale conversion section 6 converts the input gray scale value into that of the high gray scale region. However, such gray scale conversion process prevents the video signal of the low gray scale value from being output to the liquid crystal panel, thereby narrowing the range of the gray scales displayed on the liquid crystal panel 3. As a result, a contrast of a display video on the liquid crystal panel 3 would decrease in some cases. The backlight control section 4 compensates for the decreased contrast by adjusting the brightness of the backlight on the liquid panel 3 (not illustrated) according to the input gray scale value. The adjustment of the brightness of the backlight control section 4 is described below.

For instance, assume normally black liquid crystal having the relation between the input gray scale value and the transmittance shown in FIG. 2. Further assume that the gray scale conversion section 6 operates as described above so that if the gray scale conversion section 6 receives a video signal of a gray scale value of the low gray scale range, the gray scale conversion section 6 converts the gray scale value of the low gray scale range into a gray scale value of the high gray scale range.

If a gray scale value for displaying the transmittance of 0 (absolute black) is inputted, such gray scale conversion converts it into a gray scale value of the high gray scale region showing a grayish color (gray) rather than absolute black. To cope with this, the backlight control section may decrease the backlight brightness, so that gray will be perceived as absolute black.

As above, the backlight control compensates for the gray scale values unable to be expressed in black due to the gray scale conversion process by purposely decreasing brightness on the display device. As a result, the maximum brightness decreases in some degree, and the contrast ratio on the liquid crystal display device also decreases; however, visual characteristics of human beings are more sensitive brightness transitions in the gray scales closer to black (halftone) than to those in the gray scales closer to white. Therefore, decreases in the contrast ratio due to lowering high brightness in some degree are rarely perceived.

7-1. Rider 1

The gray scale conversion process by the gray scale conversion section 6 of the present embodiment can be expressed as "the process narrowing the displayable gray scale range."

The gray scale range displayable by the liquid crystal panel 3 will be limited to only the high gray scale region, which is narrower than the gray scale range originally displayable by the liquid crystal panel 3, since the gray scale conversion section 6 converts an input gray scale value into a value of the high gray scale region. Therefore, the gray scale conversion process by the gray scale conversion section 6 can be expressed as "the process narrowing the displayable gray scale range."

Furthermore, "the process narrowing the displayable gray scale range" can be expressed as the process "decreasing the contrast ratio, the ratio of the minimum gray scale value to the maximum gray scale value, on the liquid crystal display device." Narrowing the displayable gray scale range on the liquid crystal display device decreases the contrast ratio compared to before.

In addition, the gray scale conversion by the gray scale conversion section 6 of the present embodiment can be expressed also as "the process not changing the orientation angle of the liquid crystal either greater than or equal to (when a normally white screen is concerned) or less than or equal to (when a normally black screen is concerned) the preset degree."

There is the certain correlation between the orientation angle of the liquid crystal and the input gray scale value to the liquid crystal panel 3. The gray scale conversion section 6 prevents the input gray scale values from being greater or equal to (or less than or equal to) the prescribed value by converting the input gray scale value into the value of the high gray scale region. Therefore, the orientation degree of the liquid crystal will not become greater or equal to (or less than or equal to) the prescribed degree.

The gray scale conversion process of the present embodiment simply converts an input gray scale value so that requested specification for the response speed of the liquid crystal is satisfied in actual use environment. However, converting input gray scale values based on different rules depending on how much the input gray scale values are is more preferable than uniformly converting an input gray scale into a prescribed level.

FIG. 7 shows an exemplary conversion rule of a gray scale value. A LUT of FIG. 7 is used instead of that shown in FIG. 4. With this LUT, when an input value of the least significant 4 bits combined is less than or equal to 14, each of them will be converted stepwise to 10 to 15 according to their magnitudes, thereby making it possible to attain visually smooth gray scale expression.

7-2 Rider 2

The gray scale conversion process according to a gray scale value conveyed by an input video signal is explained above; however, the response speed of the liquid crystal to the input video signal is mainly influenced by temperature of the liquid crystal itself. Thus, adjusting the gray scale conversion process according to ambient temperature (atmospheric temperature) of a liquid crystal display device or surface temperature of the liquid crystal display device is more preferable. The phrase "adjusting the gray scale conversion process" means shifting a threshold dividing the low gray scale region from the high gray scale region or modifying converted gray scale values.

In that sense, knowing the temperature of the liquid crystal itself in the liquid crystal display device is the most preferable, yet measuring it is unpractical. Therefore, surface temperature of parts, which do not contributes to a display on the display screen of the liquid crystal display device, such as the outside of the effective display area, a surface of a housing of the device, and a periphery of the liquid crystal display device, should be measured with a temperature sensor instead, and the threshold dividing the low gray scale region from the high gray scale region should be shifted accordingly.

Ordinal temperature sensors, such as thermocouple (not illustrated) can measure temperature above. Application of a device outputting A/D converted digital signal, rather than analog value, as outputs of such temperature sensors facilitate the control over the gray scale conversion process above.

The LUTs can be switched over instead of switching over the thresholds in case where the gray scale conversion section 6 processes the gray scale conversion with the LUTs. A signal switching the LUTs according to temperature measured by the temperature sensor should be generated as a digital signal suitable for switching over the LUTs. Such a digital signal can be generated by A/D conversion of an analog signal conveying an output value of the temperature sensor.

In addition, the threshold can be switched over or the converted gray scale values can be adjusted according to elapsed time measured after the liquid crystal display device is turned on.

The timer mentioned above, for example, (not illustrated) may be a means for counting vertical synchronization-timing signals of the display device itself. As an alternative, clock information inputted in the liquid crystal display device externally may function as the timer. The clock information may be supplied from a clock provided in an automobile. The input of the clock information in the form of the digital signal to the display device makes it possible to count the time.

The liquid crystal display device may be arranged such that according to the elapsed time measured in above manners, the LUTs will be sequentially switched over from the one for low temperature to one for high temperature rather than the threshold is decreased gradually or varied.

Intervals of threshold shifts and LUT switch-over vary, depending on which liquid crystal display device to be used and on under what circumstance it is used: therefore, they are preferred to be set up according to preliminary measurement to measure how temperature increases rate in a use environment after the liquid crystal display device is turned on.

As matter of course, the gray scale conversion can be adjusted with the combination of the temperature sensor and the timer in consideration of the ambient temperature or surface temperature of the liquid crystal display device and the elapsed time after application of power.

Also, the liquid display device having the above configuration may be preferably configured such that the conversion of the input gray scale value above is performed with a conversion table associating converted values with input gray scale values in the liquid crystal display device above.

The gray scale conversion means conducts the gray scale conversion with the conversion table in the configuration above; therefore, the conversion process can be realized simply by the preparation of the table in advance.

Furthermore, the gray scale conversion process can also convert the gray scale value by comparing the threshold dividing the low gray scale region from the high gray scale region with the gray scale value conveyed by the input video signal. It converts the gray scale value into the value of the high gray scale region if the gray scale value is less than or equal to or if the gray scale values is less than the threshold.

In the configuration above, such simple process as comparing the input gray scale value with the threshold can stably attain the response speed of the liquid crystal within a condition where a requested specification is satisfied.

In addition, when a threshold is expressed in bits, and A (a positive natural number) is the number of the bit values of 0 successive from the most significant bit, the gray scale conversion process can convert the gray scale value conveyed by the video signal into the gray scale value of the high grays scale region if it judges that all of the bit values from the most significant bit to the most significant Ath bit are 0.

In other words, when the threshold is expressed in bits and when A is placed for the number of the bit value of 0 successive from the most significant bit, one of the most significant A bits takes the value of 1 if the gray scale value greater than or equal to the threshold is expressed in bits. Paradoxically speaking, if all the values of the most significant A bits are 0, the gray scale value is less than or equal to the threshold.

Therefore, according to the above configuration, the gray scale conversion process can judge whether or not the gray scale value is greater than or equal to the threshold by simply checking the most significant bits conveyed by the video signal. Consequently, the gray scale conversion process becomes a simple process.

When the video signal conveying the grays scale value of the low gray scale region is input, the gray scale conversion process should convert the value into one of the minimum values of the high gray scale region.

If the gray scale value is converted into a larger value of the high gray scale region, a gray scale balance of image displayed on the liquid crystal display device is disrupted since a video signal which must be expressed in the low gray scale originally is expressed in the high gray scale.

Therefore, the present invention converts the gray scale value of the input video signal into a gray scale value near a minimum gray scale value of the high gray scale region if the video signal conveying the gray scale value of the low gray scale region is inputted. This makes it possible to reduce a difference between the gray scale values before and after the gray scale conversion. As a result, it is possible to display the image in an adequate gray scale balance on the liquid display device.

Moreover, the threshold between the low gray scale region and the high gray scale region may be shifted according to either the ambient temperature of the liquid crystal device, the surface temperature of it, or the elapsed time after application of power.

Also, the liquid crystal display device of the above configuration is preferably configured such that the liquid crystal display device includes a temperature sensor that measures the temperature and outputs a digital signal output.

With this configuration, the temperature sensor can measure the temperature, and the output value of the temperature sensor is a digital value rather than an analog value. Therefore, this configuration makes it possible to easily control the gray scale conversion process.

The liquid crystal display device of the above configuration is preferably arranged such that it comprises a timer for measuring the time elapsed after the power is applied to the liquid crystal display device, the timer counting a vertical synchronization-timing signal of the liquid display device.

With this configuration, the liquid crystal display device includes a timer for measuring the time. The timer counts the vertical synchronization-timing signal of the liquid crystal display device. Therefore, it becomes possible to measure the time without generating a clock signal.

In addition, the liquid crystal display device of the above configuration is preferably configured such that the gray scale conversion process narrows the range of gray scale values possible to output to the liquid crystal drive device. The liquid crystal display device of the above configuration is preferably configured such that the gray scale conversion process decreases the contrast ratio.

Furthermore, the liquid crystal display device is preferably arranged such that it comprises a light source brightness adjustment means for adjusting brightness of the light source of the liquid crystal display device according to the gray scale value of the input video signal.

With this configuration, the light source brightness adjustment means adjusts the luminance of the light source, thereby preventing the decreases in the contrast caused by the gray scale conversion process of the gray scale conversion process.

The gray scale conversion process of the gray scale conversion process is also defined as the process decreasing the contrast ratio of the maximum displayable gray scale value to the minimum displayable value on the liquid crystal display device.

A method according to the present invention is a method for operating liquid crystal of a liquid crystal display device including a liquid crystal drive device for operating the liquid crystal according to an input video signal inputted in the liquid crystal display device, the method comprising the steps of: converting a gray scale value conveyed by the input video signal into a value of the high gray scale region when the gray scale value conveyed by the input video signal is of the low gray scale region; and if the input video signal conveying a gray scale value belonging to a low gray scale region, converting the gray scale value of the input video signal to a gray scale value belonging to a high gray scale region, where the low gray scale region is one of two regions into which a range of possible gray scale values are divided and to which gray scale values that cause the display device to display at low luminance are belonged and the high gray scale region is the other one of the two regions to which gray scale values that cause the display device to display at high luminance are belonged; and outputting the video signal having the converted gray scale value to the liquid crystal driving device.

With this configuration, the means of the present invention can realize the same process as the gray scale conversion process of the liquid crystal device of the present invention.

The present invention is characterized by converting the gray scale value conveyed by the video signal, which is before the gray scale value conveyed by the signal for driving the liquid crystal display device. Therefore, the present invention can be applied to any device whose response speed shifts according to temperature like the liquid crystal display device.

The present invention attains that a response speed of liquid crystal can be stably within a requested specification and a circuit dimension can be downsized.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention makes it possible that a response speed of liquid crystal can be stably within a requested specification and a circuit dimension can be downsized. Therefore, the present invention is preferably applicable to an instrumental panel of an automobile, which highly requires stabilization of the response speed of the liquid crystal at low temperature.

The invention claimed is:

1. A liquid crystal display device including a liquid crystal drive device for operating liquid crystal according to an input video signal inputted in the liquid crystal display device, comprising:
   a gray scale conversion section configured to convert a gray scale value of the input video signal to a gray scale value belonging to a high gray scale region, and output the video signal conveying the converted gray scale value to the liquid crystal drive device if the input video signal conveys a gray scale value belonging to a low gray scale region,
   where receipt of the input video signal at the liquid crystal display devices and the converted gray scale value both correspond to a same frame, and where the low gray scale region is one of two regions into which a range of possible gray scale values are divided, the low gray scale region corresponding to gray scale values that cause the liquid crystal display device to display at low luminance, and the high gray scale region is the other one of the two regions, the high gray scale region corresponding to gray scale values that cause the display device to display at high luminance,
   the gray scale conversion section converting all gray scale values belonging to the low gray scale region to gray scale values belonging to the high gray scale region,
   the liquid crystal drive device operating the liquid crystal so that a video image is displayed just by use of the gray scale values belonging to the high gray scale region.

2. The liquid crystal display device as set forth in claim 1 wherein the gray scale conversion section performs a conversion with a conversion table in which the gray scale values are associated to values to which they will be converted.

3. The liquid crystal display device as set forth in claim 1, wherein the gray scale conversion section compares a threshold with the gray scale value conveyed by the input video signal, the threshold dividing the low gray scale region from the high gray scale region; and perform the conversion if the gray scale value is less than or equal to the threshold or if the gray scale value is less than the threshold.

4. The liquid crystal display device as set forth in claim 1, wherein the gray scale conversion section judges whether A numbers of bit values from a most significant bit of the gray scale value conveyed by the input video signal are all 0 or not, where the A number is a number of sequential bits of bit value of 0 from the most significant bit in an bit expression of a threshold gray scale value dividing the low gray scale region and high gray scale region, and A number is a positive natural number.

5. The liquid crystal display device as set forth in claim 1 wherein the gray scale conversion section performs the conversion in such a manner that the gray scale value of the input video signal is converted into a gray scale value near a minimum gray scale value of the high gray scale region if the video signal conveying the gray scale value of the low gray scale region is inputted.

6. The liquid crystal display device as set forth in claim 1 wherein the gray scale conversion section shifts a threshold according to an ambient temperature of the liquid crystal display device, the threshold dividing the low gray scale region from the high gray scale region.

7. The liquid crystal display device of claim 6, comprising:
a temperature sensor for measuring the temperature, and outputting a digital video output.

8. The liquid crystal display device as set forth in claim 1 wherein the gray scale conversion section shifts a threshold according to a surface temperature of the liquid crystal display device, the threshold dividing the low gray scale region from the high gray scale region.

9. The liquid crystal display device as set forth in claim 1 wherein the gray scale conversion section shifts a threshold according to a time elapsed after power is applied to the liquid crystal display device, the threshold dividing the low gray scale region from the high gray scale region.

10. The liquid crystal display device as set forth in claim 9, comprising:
a timer for measuring the time elapsed after the power is applied to the liquid crystal display device, the timer counting a vertical synchronization-timing signal of the liquid display device.

11. The liquid crystal display device as set forth in claim 1 wherein the gray scale conversion section narrows a range of gray scale values possible to output to the liquid crystal drive device.

12. The liquid crystal display device as set forth in claim 1 wherein the gray scale conversion section decreases a contrast ratio.

13. The liquid crystal display device as set forth in claim 1, comprising:

a light source brightness adjustment section for adjusting brightness of a light source of the liquid crystal display device according to the gray scale value of the input video signal.

14. An instrumental panel comprising a liquid crystal display device as set forth in claim 1.

15. An automobile vehicle comprising an instrumental panel as set forth in claim 14.

16. A liquid crystal display device including a liquid crystal drive device for operating liquid crystal according to an input video signal inputted in the liquid crystal display device, comprising:
a gray scale conversion section configured to convert all gray scale values belonging to a low gray scale region to gray scale values belonging to a high gray scale region, so that a ratio of a maximum gray scale value to a minimum gray scale value displayable on the liquid crystal display device is decreased,
where the low gray scale region is one of two regions in which a range of possible gray scale values are divided, the low gray scale region corresponding to gray scale values that cause the liquid crystal display device to display at low luminance, and the high gray scale region is the other one of the two regions, the high gray scale region corresponding to gray scale values that cause the display device to display at high luminance.

17. A method for operating liquid crystal of a liquid crystal display device including a liquid crystal drive device for operating the liquid crystal according to an input video signal inputted in the liquid crystal display device, the method comprising the steps of:
converting a gray scale value of the input video signal to a gray scale value belonging to a high gray scale region if the gray scale value conveyed by the input video signal is of a low gray scale region; and
outputting the video signal conveying the converted gray scale value to the liquid crystal driving device, where receipt of the input video signal at the liquid crystal display devices and the converted gray scale value both correspond to a same frame, and where the low gray scale region is one of two regions into which a range of possible gray scale values are divided, the low gray scale region corresponding to gray scale values that cause the liquid crystal display device to display at low luminance, and the high gray scale region is the other one of the two regions, the high gray scale region corresponding to gray scale values that cause the display device to display at high luminance,
the converting the gray scale value step including converting all gray scale values belonging to the low gray scale region to gray scale values belonging to the high gray scale region, and
the liquid crystal drive device operating the liquid crystal so that a video image is displayed just by use of the gray scale values belonging to the high gray scale region.

* * * * *

UNITED STATES PATENT AND TRADEMARK OFFICE
CERTIFICATE OF CORRECTION

| | | |
|---|---|---|
| PATENT NO. | : 8,339,345 B2 | Page 1 of 1 |
| APPLICATION NO. | : 11/990397 | |
| DATED | : December 25, 2012 | |
| INVENTOR(S) | : Hidetaka Mizumaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this
Fifteenth Day of July, 2014

Michelle K. Lee
*Deputy Director of the United States Patent and Trademark Office*